2,952,062

METHOD OF CURING CONCRETE

Richard M. Tillman, Ponca City, Okla., assignor to Continental Oil Company, Ponca City, Okla., a corporation of Delaware No Drawing. Filed Sept. 9, 1957, Ser. No. 682,645

7 Claims. (Cl. 25—154)

This invention relates to a method of retarding the evaporation of water from concrete during the curing period in order to insure thorough hydration of the cement and thereby produce a concrete of maximum strength.

As is well known, water must be retained in new concrete for a sufficient length of time to permit the concrete to cure. Curing means retention of the mixing water until hydration or the chemical reaction of the cement, sand and water is completed. After concrete is placed and finished by trowelling, screeding or belting, evaporation of the mixing water must be prevented until hydration of the cement is completed. This is universally recognized as essential to the production of durable concrete. Various methods have been used heretofore to retain water in newly layed concrete for a sufficient period of time to effect curing. One method is that of surrounding the new concrete with embankments which confine quantities of water poured over the concrete. This method is known as ponding and is impractical for long stretches of roadway and shorter stretches on grades, as well as being expensive. In another method, as soon as the concrete can sustain considerable weight the surface is covered with several inches of earth which must be kept wet and, of course, after the cement has cured the earth must be removed from the roadway before the same can be opened to traffic. Other methods make use of various coverings such as straw, hay, burlap, canvas, and etc., which can be kept wet and which retard evaporation from the concrete as well as protect the concrete from the direct rays of the sun. As is apparent, such coatings must be removed before the roadway can be used. In another method, the concrete is coated with an impervious hydrocarbon film such as asphalt or paraffin diluted with a light hydrocarbon solid. The asphalt has very good water retention properties but cannot be used in many applications such as buildings, bridges, etc., due to its unsightly color. Furthermore, the dark color of the asphalt renders its use undesirable in hot climates, since it causes heat to be absorbed from the sun, thus allowing the concrete to cure at too high a temperature. Paraffin coatings, while not objectionable from a color standpoint, melt or crack and peel readily and, in addition, generally do not have satisfactory water retaining properties. In water retention properties, paraffin coatings are much inferior to the asphalt coatings.

It is, therefore, a principal object of the present invention to provide a method which obviates the disadvantages of the prior art methods. Another object of this invention is to provide a coating composition for concrete which aids in the curing of the concrete. These and other objects and advantages will become apparent as the invention is more thoroughly described.

The foregoing objects and advantages are attained by a process which, in brief, may be described as follows:

The surface of the concrete is coated with a composition comprising a volatile petroleum hydrocarbon solvent, a microcrystalline wax, a light reflective inorganic pigment, and a product selected from the group consisting of a limed rosin, a limed polymerized rosin, a calcium zinc resinate, or an admixture of these materials. The microcrystalline wax acts as a primary film forming substance, while the limed rosin, limed polymerized rosin or the resinate, or mixtures thereof, make up a secondary film forming substance.

Before proceeding with specific examples illustrating my invention, it may be well to indicate in general the types of compounds which may be used in the process.

As used herein and in the appended claims, the term "microcrystalline wax" is a residual product of a high molecular weight petroleum hydrocarbon. The structure of microcrystalline wax as it is commonly understood includes a large proportion of naphthenic materials, as well as straight chain hydrocarbons. Microcrystalline wax is characterized by being less crystalline than paraffin wax and is further characterized by its ability to occlude oil. As to its physical properties, it is flexible and ductile. Microcrystalline wax is not a chemically pure compound, as the term is generally understood in chemical technology, but is a mixture of compounds and for that reason it does not have any clearly defined melting point. In general, these waxes melt over a range varying from about 125 to 200° F.

Suitable petroleum hydrocarbon solvents are those having boiling points within the range of about 100 to 175° F. Solvents are selected having boiling points within this range in order that the solvent, after application of the mixture to the surface of the concrete, will evaporate leaving a film of wax and the other components of the mixture on the concrete. Either pure hydrocarbons having a boiling point within this range or mixtures of hydrocarbons may be used. For economical reasons I prefer mixtures of hydrocarbons.

Suitable inorganic pigments include any inorganic pigment that is light in color and is compatible with the other components in the concrete curing composition. Suitable light colored pigments include titanium dioxide, calcium rutile, lead oxide, zinc oxide, and other economical pigments. Calcium rutile is a pigment containing 30 percent titanium dioxide and 70 percent calcium sulfate.

As to the secondary film forming composition, this product is used because I have found that it is necessary in order to induce rapid drying to a tough film capable of being walked upon without damage or "tracking off" of the film. The secondary film forming agent also performs another function in that it prevents extensive cracking of the surface film that occurs when an inorganic pigment is included in a mixture of petroleum solvent and microcrystalline wax alone. In addition, this secondary film forming agent contributes to the efficiency of concrete curing by forming a more homogeneous film. Suitable secondary film forming agents include limed rosin, limed polymerized rosin, calcium zinc resinate, or a combination thereof.

As to the amount of each component used in my cement curing composition, that may be varied rather widely. Suitable quantities on a weight basis vary from 5 to 20 percent of the secondary film forming agent, 5 to 25 percent inorganic pigment, 5 to 30 percent microcrystalline wax, and 45 to 65 percent solvent. Preferred quantities, again on a weight basis, vary from 7.5 to 12.5 of the secondary film forming agent, 10 to 15 percent inorganic pigment, 15 to 20 percent microcrystalline wax, and 52.5 to 67.5 percent solvent.

In order to disclose the nature of the present invention still more clearly the following illustrative examples will be given. It is to be understood, however, that the invention is not to be limited to the specific conditions or details set forth in these examples except in so far as such limitations are specified in the appended claims. Parts given are parts by weight.

In the examples listed below the method of determining water retention was that described in ASTM Specification C–156–55, ASTM Standards 1955, part 3, American Society for Testing Materials, Philadelphia, Pennsylvania.

EXAMPLE 1

A cement curing composition prepared in accordance to this example and my invention contained the following components:

20 parts Nulex–15
    20 parts calcium rutile pigment
    33 parts of microcrystalline wax
    127 parts wash naphtha Nulex–15 is a limed polymerized rosin supplied by Newport Industries, Inc. It has a ball and ring melting point of 331° F. and is completely soluble in aliphatic hydrocarbons. Additional information on this material is shown in Table II. The particular microcrystalline wax used in this example had a melting point of 170° F., a maximum oil content of 3 percent, and a penetration at 77° F. of between 40 and 85.

EXAMPLE 2

In this example a curing composition was prepared containing the following components:

15 parts Zinar
    15 parts Nulex–15
    20 parts calcium rutile pigment
    40 parts microcrystalline wax
    120 parts wash naphtha The Zinar used in this example is a limed zinc rosinate supplied by Newport Industries, Inc., and has a ball and ring melting point of 345° F. It is also completely soluble in aliphatic hydrocarbons. Additional information on this material is shown in Table II.

EXAMPLE 3

The composition of Example 2 was repeated except that 15 parts of Valros LF–65 was substituted for the 15 parts Zinar. Valros LF–65 is a calcium zinc rosinate supplied by Crosby Chemical Company. Additional information on this material is shown in Table II.

As pointed out above, the water retention of these compositions when used as cement curing compositions was determined along with Commercial Product A, a widely used product for curing cement. The commercial product used was a product known as a White curing composition.

Table I

| Cement Curing Composition | Percent Water Retention As Per A.S.T.M. C-156-55 | | | |
| --- | --- | --- | --- | --- |
| | 1 | 2 | 3 | Average |
| None | 69.0 | 66.2 | 72.3 | 69.2 |
| Commercial Product A | 93.8 | 94.1 | 91.6 | 93.2 |
| Composition of Example 1 | 97.4 | 94.7 | 97.2 | 96.6 |
| Composition of Example 1 sans Nulex-15 | 74.0 | 74.8 | 72.0 | 73.6 |
| Composition of Example 2 | 97.9 | 97.1 | 96.9 | 97.3 |
| Composition of Example 3 | 98.0 | 98.1 | 97.9 | 98.0 |

Table II

ANALYTICAL DATA—TRADE NAME MATERIALS

| | Zinar | Nulex–15 | Valros LF–65 |
| --- | --- | --- | --- |
| Percent Ash | 11.30 | 8.10 | 9.47 |
| Percent Ca [1] | 1.7 | 2.3 | 2.8 |
| Percent Zn [1] | 4.5 | <0.05 | 1.2 |
| Percent Al [1] | <0.1 | 0.05 | <0.01 |
| Acid No. [2] | 53 | 59 | 54 |
| Zn/Ca atomic ratio | 1.62 | | 0.26 |

[1] Emission spectrographic method.
[2] ASTM Method D-664, using the Precision-Dow Recording Titrimeter.

It is to be understood that the invention is not intended to be restricted to any particular example, composition or proportions, or to any particular application, or to any specific manner of use or to any of various details thereof, herein described, as the same may be modified in various particulars or be applied in many varied relations without departing from the spirit and scope of the claimed invention, the practical embodiments herein described merely showing some of the various features entering into the application of the invention.

I claim:

1. The process of curing concrete which comprises applying to the concrete as a surface coating before the concrete has set a composition comprising on a weight basis a volatile petroleum hydrocarbon solvent, 45 to 65 percent, a microcrystalline wax, 15 to 20 percent, as a film forming substance, a secondary film forming substance, 5 to 20 percent, selected from the group consisting of a limed rosin, a limed polymerized rosin, a calcium zinc rosinate, wherein the combined calcium and zinc content does not exceed the stoichiometric amount necessary for the neutralization of the rosin acids present in the rosin and mixtures thereof, and an inorganic light reflective pigment, 5 to 25 percent.

2. The process of curing concrete which comprises applying to the concrete as a surface coating before the concrete has set a composition comprising on a weight basis a volatile petroleum hydrocarbon solvent, 52.5 to 67.5 percent, a microcrystalline wax, 15 to 20 percent, as a film forming substance, a secondary film forming substance, 7.5 to 12.5 percent, selected from the group consisting of a limed rosin, a limed polymerized rosin, a calcium zinc rosinate, wherein the combined calcium and zinc content does not exceed the stoichiometric amount necessary for the neutralization of the rosin acids present in the rosin and mixtures thereof, and an inorganic light reflective pigment, 10 to 15 percent.

3. The process of claim 1 wherein the inorganic light reflective pigment is titanium dioxide.

4. The process of claim 1 wherein the inorganic light reflective pigment is lead oxide.

5. The process of claim 1 wherein the inorganic light reflective pigment is zinc oxide.

6. The process of claim 1 wherein the inorganic light reflective pigment is a mixture of titanium dioxide and calcium sulfate.

7. The process of claim 1 wherein the volatile petroleum hydrocarbon solvent is a solvent having a boiling point within the range of 100° to 175° F.

References Cited in the file of this patent

UNITED STATES PATENTS

| | | |
| --- | --- | --- |
| 524,781 | Klenk | Aug. 21, 1894 |
| 529,241 | Bruycker et al. | Nov. 13, 1894 |
| 666,807 | Just | Jan. 29, 1901 |
| 1,236,367 | Barton | Aug. 7, 1917 |
| 1,599,598 | Swett | Sept. 14, 1926 |
| 1,867,421 | Rowan et al. | July 12, 1932 |
| 1,942,000 | Reynolds | Jan. 2, 1934 |
| 2,143,515 | Hayden | Jan. 10, 1934 |
| 2,648,616 | Gauthier | Aug. 11, 1953 |
| 2,839,811 | Benedict et al. | June 24, 1958 |